United States Patent [19]

Hiratsuka et al.

[11] Patent Number: 5,029,013
[45] Date of Patent: Jul. 2, 1991

[54] APPARATUS FOR EDITING VIDEO TAPES

[75] Inventors: Masaru Hiratsuka; Hitoshi Nakashima; Kiyoshi Nakagawa, all of Kanagawa; Shinya Fukushima, Saitama, all of Japan

[73] Assignee: Sony Corporation, Tokyo, Japan

[21] Appl. No.: 275,377

[22] Filed: Nov. 23, 1988

[30] Foreign Application Priority Data

Nov. 26, 1987 [JP] Japan ................... 62-298604

[51] Int. Cl.⁵ .................. H04N 5/782; G11B 5/86
[52] U.S. Cl. ..................... 358/335; 360/13; 360/15; 360/33.1
[58] Field of Search ............ 358/335, 311, 183, 22; 360/14.1, 33.1, 32, 15

[56] References Cited

U.S. PATENT DOCUMENTS

| | | |
|---|---|---|
| 4,272,790 | 6/1981 | Bates . |
| 4,365,313 | 12/1982 | Menezes et al. . |
| 4,377,824 | 3/1983 | Kuperman et al. . |
| 4,638,360 | 1/1987 | Christopher et al. . |
| 4,673,983 | 6/1987 | Sarugaku et al. ............ 358/22 |
| 4,768,110 | 8/1988 | Dunlap et al. ............. 360/15 |
| 4,777,531 | 10/1988 | Hakamada et al. ............. 358/183 |

FOREIGN PATENT DOCUMENTS

EP-A-291934 11/1988 European Pat. Off. .

Primary Examiner—Roy N. Envall, Jr.
Assistant Examiner—Huy Nguyen
Attorney, Agent, or Firm—Alvin Sinderbrand; William S. Frommer

[57] ABSTRACT

Dual video recording/reproducing apparatus includes a video playback unit, a video recording unit having recording circuitry for recording a video output signal from the video playback unit, as well reproducing circuitry for reproducing a video signal, and a sub-picture signal former responsive to a video signal supplied thereto for providing a sub-picture signal adapted to be displayed as a sub-picture insert of a main picture. A switch couples either the video output from the video playback unit or the video output from the reproducing circuitry included in the video recording unit to the sub-picture signal former. The video signal which is not coupled to the sub-picture signal former constitutes the main picture signal; and the sub-picture and main picture signals are combined to form a display signal which, when displayed, produces a main picture and a sub-picture insert. A common housing contains the video playback and video recording units, the sub-picture signal former, the switch and the sub-picture/main picture signal combining circuit.

11 Claims, 6 Drawing Sheets

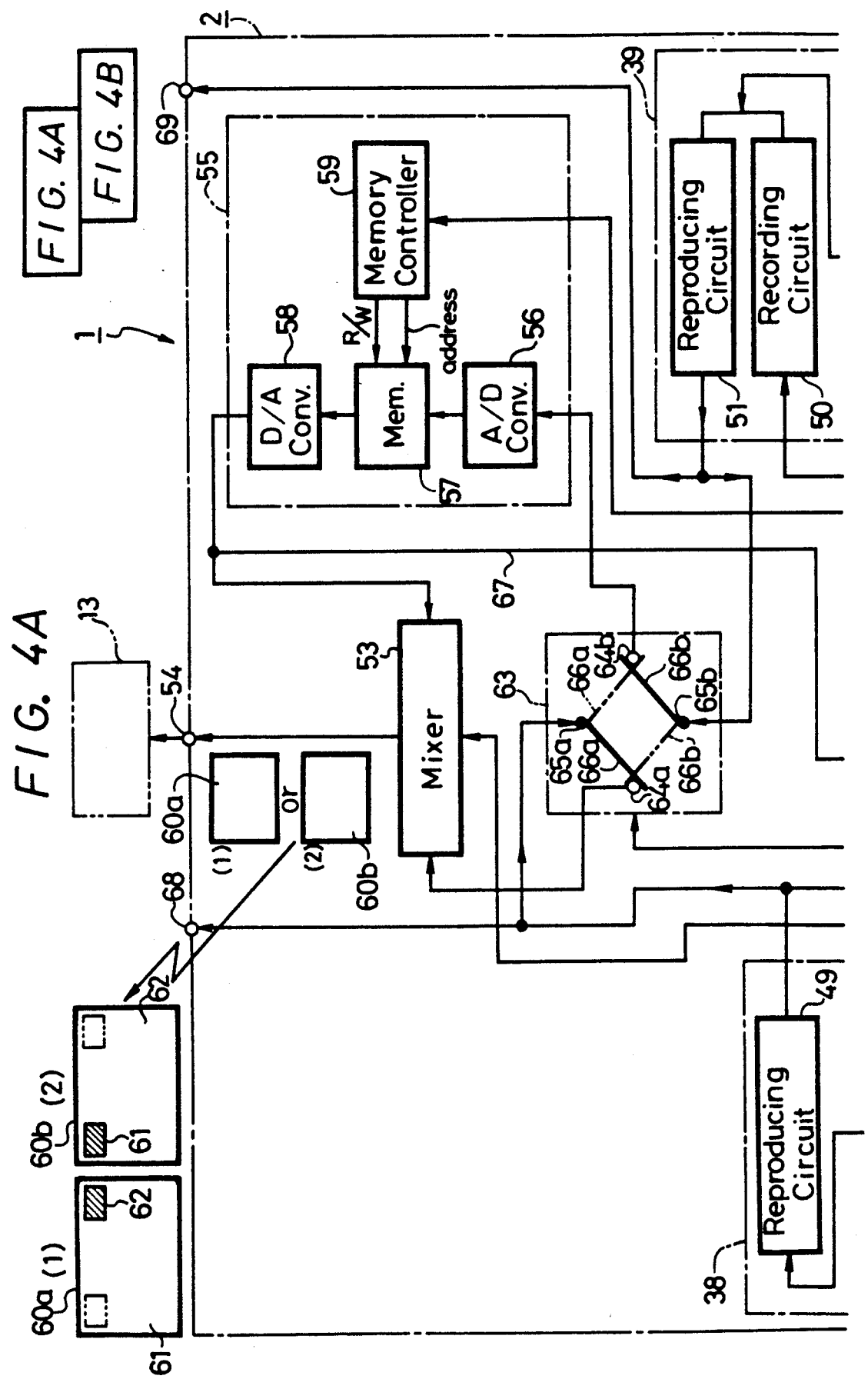

APPARATUS FOR EDITING VIDEO TAPES

BACKGROUND OF THE INVENTION

1. Field of the Invention

This invention relates to video tape editing apparatus and, more particularly, to such apparatus adapted to be used with a common video display for concurrently displaying an original video picture derived from a source video tape and an edit video picture derived from an edit video tape. The dual pictures, that is, the original and edit video pictures, are readily distinguishable even though they are displayed on a common monitor.

2. Description of the Prior Art

Video editing apparatus is known wherein video signals derived from one source are combined with video signals derived from another source, the combined video signals being suitably stored for subsequent playback and display, such as on an edited video tape. Typically, video as well as audio signals recorded on one tape which, for convenience herein, is designated the source or original tape, are played back and then re-recorded on a target tape, which is referred to herein as an edit tape. Thus, program material from different program sources may be combined, in selected segments and in desired sequence, on a single video tape to form an edited program Such editing is common in television programming, television journalism, etc.

When carrying out an edit operation with known apparatus, separate video displays, or monitors, are used to display video pictures played back from the original and edit tapes, respectively. Such displays enable the operator to determine the particular portions, or segments, which he wishes to transfer from the original tape to the edit tape; and also to identify the location on the edit tape at which such transferred segments should be recorded. Thus, the separate monitors are helpful in searching the original and edit tapes, respectively, to find the proper materials for editing.

A typical embodiment of editing apparatus using two monitors for the aforementioned purpose is illustrated in FIG. 1. As shown, video editing apparatus 100 include an edit circuit 101 which responds to control signals supplied thereto from a control circuit 102 to control the operations of a video tape player 105 and a video record/playback device (referred to simply as a video recorder) 106. A keyboard 103 and a so-called jog dial 104 are manually operated by an operator to select the various video playback and video recording operations that are controlled by edit circuit 101. A monitor 107, referred to as an original picture monitor, is coupled to video player 105 to display video pictures corresponding to the video signals reproduced by the video player Similarly, a monitor 108, referred to as an edit picture monitor, is coupled to video recorder 106 to display the video pictures corresponding to the video signals which are reproduced by a playback operation carried out by the video recorder.

To carry out a typical edit operation, keyboard 103 and jog dial 104 are operated by the operator such that video player 105 reproduces video signals from the original tape for display as a picture by monitor 107. The operator views the displayed video picture until a desired picture is reached. Jog dial 104 may be operated to advance the original tape slowly, on a frame-by-frame basis, to facilitate the operator's search for a desired segment on the original tape. When the desired segment is reached, as will be observed by the picture displayed on monitor 107, keyboard 103 is operated to establish a pause mode for video player 105. Then, while the video player pauses, and while the desired video picture is displayed on monitor 107, keyboard 103 is operated such that video recorder 106 is controlled to play back the video signals recorded on the edit tape. The edit tape playback operation is quite similar to the original tape playback operation; and the video signals reproduced from the edit tape are displayed by monitor 108. When the operator observes a desired picture on monitor 108 at which the video signals from the original tape are to be transferred, keyboard 103 is operated to dispose video recorder 106 in its pause mode. Here too, jog dial 104 may be operated to advance the edit tape on a frame-by-frame basis to facilitate the precise location of that portion of the edit tape whereafter the original tape video signals are to be transferred.

At this stage of the edit operation, original picture monitor 107 displays the beginning of the video segment to be transferred from the original tape to the edit tape; and edit picture monitor 108 displays the starting point on the edit tape at which point the transferred video signals are to be inserted. Then, upon suitable operation of keyboard 103, video signals reproduced from video player 105 are transferred to and recorded on the edit tape by video recorder 106.

Video editing apparatus 100 also may be operated such that the beginning and end of each segment to be transferred from the original tape to the edit tape is identified. For example, while observing the video picture reproduced from the original tape, the operator may actuate suitable control keys to mark the beginning and ending locations on the original tape of the segment to be transferred. When the marked ending location is reached, the transfer operation terminates As a further alternative, the transfer operation of video signals from the original tape to the edit tape may continue until a stop edit key is actuated.

When using programmable editing apparatus, several segments on the original tape may be identified by their respective beginning and ending locations, as aforementioned. Once all of these segments have been found and designated, the transfer operation from the original tape to the edit tape may be carried out automatically and by remote control.

Video editing apparatus of the type illustrated in FIG. 1 and having the various operating capabilities discussed above heretofore has required the use of two separate monitors. This not only adds to the cost of the apparatus but presents significant space requirements to accommodate two display devices. Also, by observing two separate monitors, the operator may find a complicated editing operation to be quite tiresome.

Recently, video equipment has been proposed in which two separate video pictures are displayed concurrently on a single display screen. Such picture-in-a-picture display would be useful in video editing apparatus. A video picture derived from an original tape and a video picture derived from an edit tape can be displayed simultaneously on such video equipment One of these pictures would be displayed as a so-called main picture and the other would be displayed as a reduced size inserted sub-picture However, by reason of its reduced size, it may be difficult to observe the inserted sub-picture adequately. Particular details which may be important in an editing operation, such as details needed to identify a desired video segment to be edited, might not be adequately discerned. For example, if the video picture derived from the edit tape is displayed as the sub-picture insert, it may be difficult for the operator to select the proper location on the edit tape at which video signals from the original tape should be transferred.

If the main picture displayed by the aforementioned video equipment can be derived from either the original tape or the edit tape, an operator may find it difficult to remember whether the main picture is derived from the original tape and the sub-picture insert is derived from the edit tape, or vice versa. Since the sub-picture generally is inserted at the very same location in the main picture regardless of the particular tape from which that sub-picture is derived, there is a strong possibility that, after several hours of editing, the operator may not recall what is represented by the main picture and what by the sub-picture. Consequently, errors in the editing operation may be produced; and the operation itself is time-consuming and quite labor intensive.

OBJECTS AND SUMMARY OF THE INVENTION

Therefore, it is an object of the present invention to provide improved apparatus for editing video tapes.

Another object of this invention is to provide a dual video recording/reproducing apparatus used with a single video monitor for displaying a main picture and a sub-picture providing information that can be readily discerned and identified by an operator.

A further object of this invention is to provide video editing apparatus of the aforementioned type wherein a main picture may be derived from either an original tape or an edit tape, and the sub-picture may be derived from the other tape; and wherein the particular location of the sub-picture in the main picture identifies the source thereof.

An additional object of this invention is to provide editing apparatus of the aforementioned type wherein the source of the displayed main picture and the source of the displayed sub-picture may be easily and simply exchanged under operator control, as may be desired.

Yet another object of this invention is to provide improved video editing apparatus, as aforesaid, wherein a single, common display monitor is provided, and wherein editing equipment is housed in a single housing, thereby minimizing space requirements for the editing apparatus while simplifying overall control over the edit operation.

Various other objects, advantages and features of the present invention will become readily apparent from the ensuing detailed description, and the novel features will be particularly pointed out in the appended claims.

In accordance with this invention, dual video recording/reproducing apparatus is provided with a video playback unit and a video recording unit including a recorder for recording a video signal from the video playback unit and a reproducer for reproducing a video signal. A sub-picture signal former responds to a video signal supplied either from the video playback unit or from the video recording unit for producing a sub-picture signal adapted to cause the display of a sub-picture insert of a main picture. A switch determines whether the video signal from the video playback unit or the video signal from the video recording unit is supplied to the sub-picture signal former, the other video signal being used as a main picture signal. A mixer combines the sub-picture and main picture signals to a display signal adapted to display a main picture and sub-picture on a single video display device. The video playback and video recording units, as well as the sub-picture signal former, switch and mixer are contained in a common housing.

In accordance with one feature of this invention, the sub-picture signal former is comprised of an analog-to-digital converter for receiving the video signal from the video playback unit or from the video recording unit, a memory for storing the digitized video signal produced by the analog-to-digital converter, a digital-to-analog converter to convert the stored, digitized video signal to analog form, and a memory control for controlling at least the reading of the digital signals from the memory. As one aspect of this feature, the memory controller operates to control the time at which the digital signals are read from the memory, thereby determining the location in the main picture at which the sub-picture is inserted. By delaying the time at which the stored digital signals are read from the memory, the particular location of the sub-picture insert in the main picture is changed.

As yet another aspect of this feature, the memory controller operates to control the writing of only selected digital signals from the analog-to-digital converter to the memory so as to reduce the size of the sub-picture relative to the main picture.

In accordance with yet another feature of this invention, the memory of the sub-picture former stores a frame of the digitized video signals produced by the analog-to-digital converter; and the output of the digital-to-analog converter is recorded repetitively, as on a video tape, such that when this signal is reproduced from the video tape, a still picture is displayed.

BRIEF DESCRIPTION OF THE DRAWINGS

The following detailed description, given by way of example, will best be understood in conjunction with the accompanying drawings-in which:

FIGS. 4A and 4B comprise a block diagram of a preferred embodiment of the present invention.

DETAILED DESCRIPTION OF A PREFERRED EMBODIMENT

Figure 1:
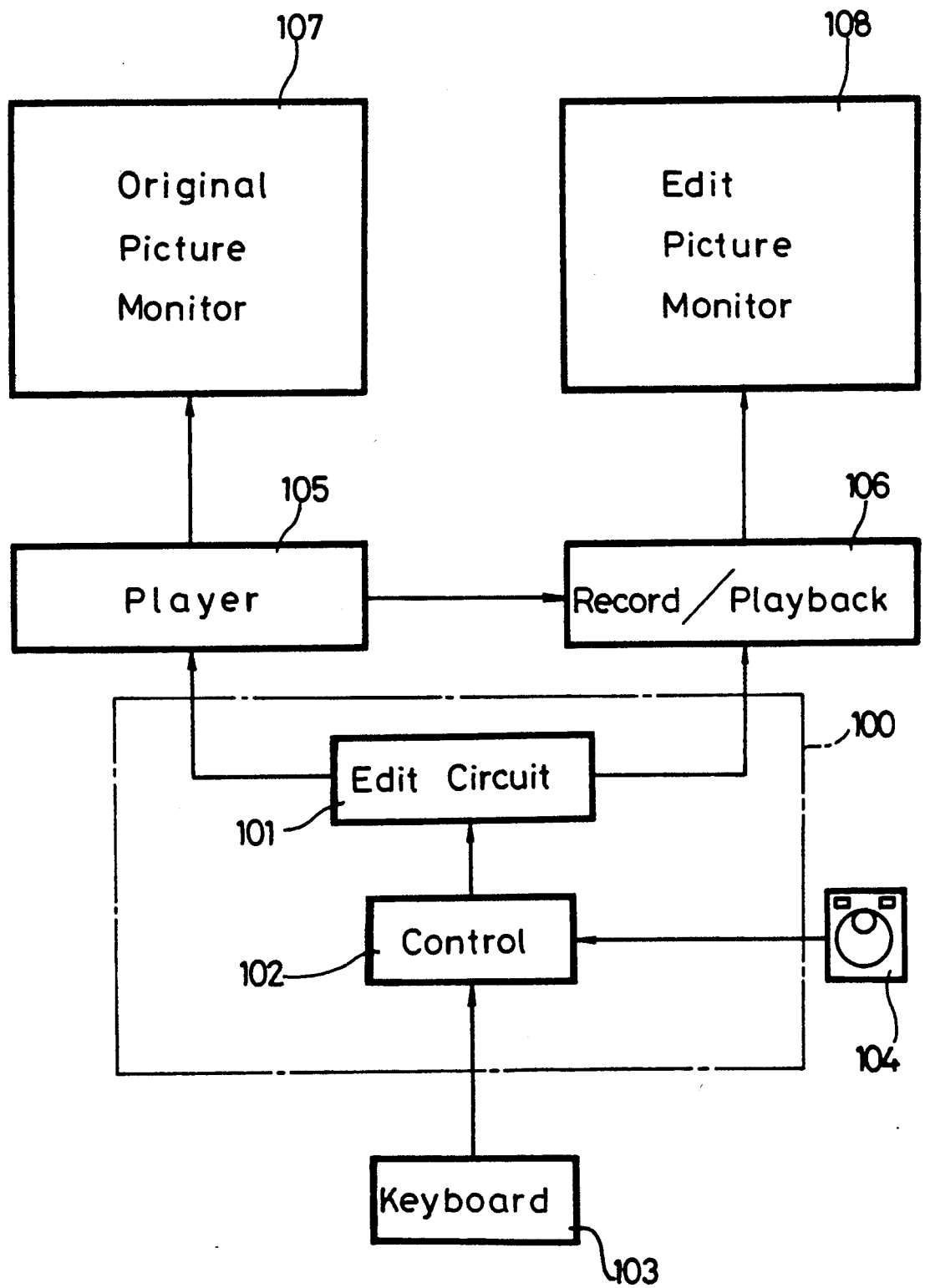
FIG. 1 is a block diagram representing an overall embodiment of a conventional video editing system.
Figure 2:
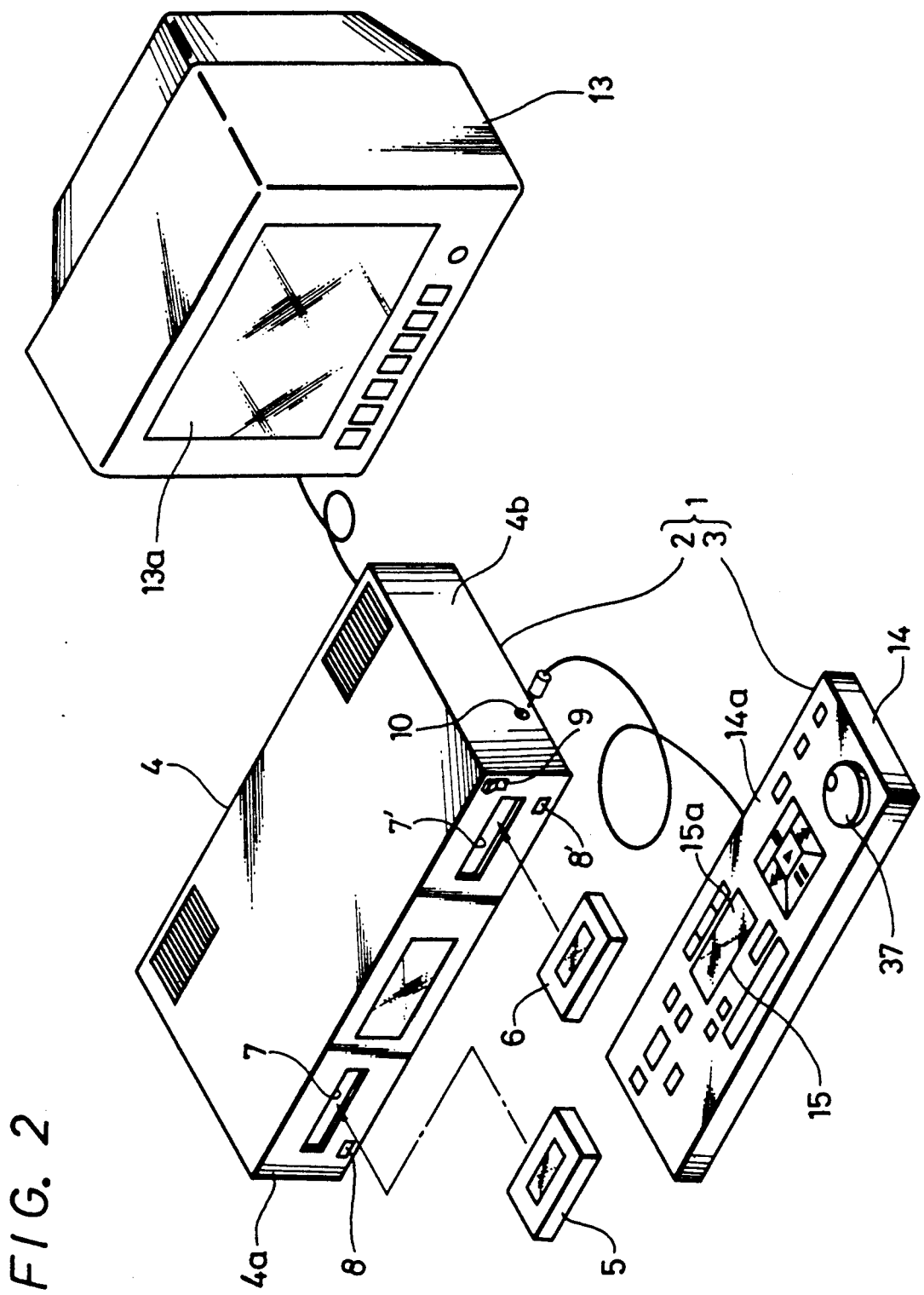
FIG. 2 is a perspective view of a video editor and monitor which incorporates the present invention.

Referring now to FIG. 2, there is illustrated a perspective view of a preferred embodiment of video editing apparatus in accordance with the present invention. Apparatus 1 is comprised of a main unit 2 and a keyboard 3. Main unit 2 includes a housing 4 having a video playback unit and a video recording unit therein. It will be understood from the ensuing description that the video playback unit may include the capability of recording and reproducing video signals; but to carry out the video editing operation described herein, only the video reproducing capability is of interest. Consequently, this unit is referred to simply as a video playback unit. The video recording unit included within housing 4 is adapted to record and reproduce video signals but, for simplicity, and to distinguish it from the video playback unit, is described simply as a video recording unit.

Housing 4 includes openings 7 and 7' therein adapted to receive video tape cassettes 5 and 6, respectively, for loading the video cassettes onto the video playback and recording units, respectively. Although openings 7 and 7' are illustrated as being disposed in front wall 4a of housing 4, such openings may be disposed in other suitable locations, as may be desired. It will be appreciated that the video tape cassettes are both loaded and ejected via these openings. To accomplish the latter operation, eject buttons 8 and 8' are illustrated for ejecting video tape cassettes 5 and 6 from the video playback and recording units, respectively.

Housing 4 also is provided with a power switch 9 adapted to supply and terminate power to the video playback and recording units and other circuitry included within housing 4, as will be described. In addition, a terminal, or socket 10, is provided on, for example, side wall 4b of housing 4, this socket being adapted to receive a plug coupled to keyboard 3. Signals generated by the keyboard thus are coupled to main unit 2 for controlling an edit operation, as will be described.

The rear wall of housing 4 is provided with various connections and terminals, including a terminal for supplying video signals to a monitor 13. The monitor includes a display screen 13a and is adapted to display video pictures reproduced from video tape cassettes 5 and 6, as will be described. For the purpose of the present discussion, it is assumed that video tape cassette 5 constitutes an original tape from which video signals are played back by the video playback unit. Consistent with this convention, video tape cassette 6 is designated the edit tape on which are recorded video signals transferred thereto from original tape 5 by the cooperation of the video playback and recording units. Video signals recorded on edit tape 6 also are reproduced by the reproducing circuitry included in the video recording unit; and these reproduced signals are displayed as a suitable picture on display screen 13a.

Figure 3:
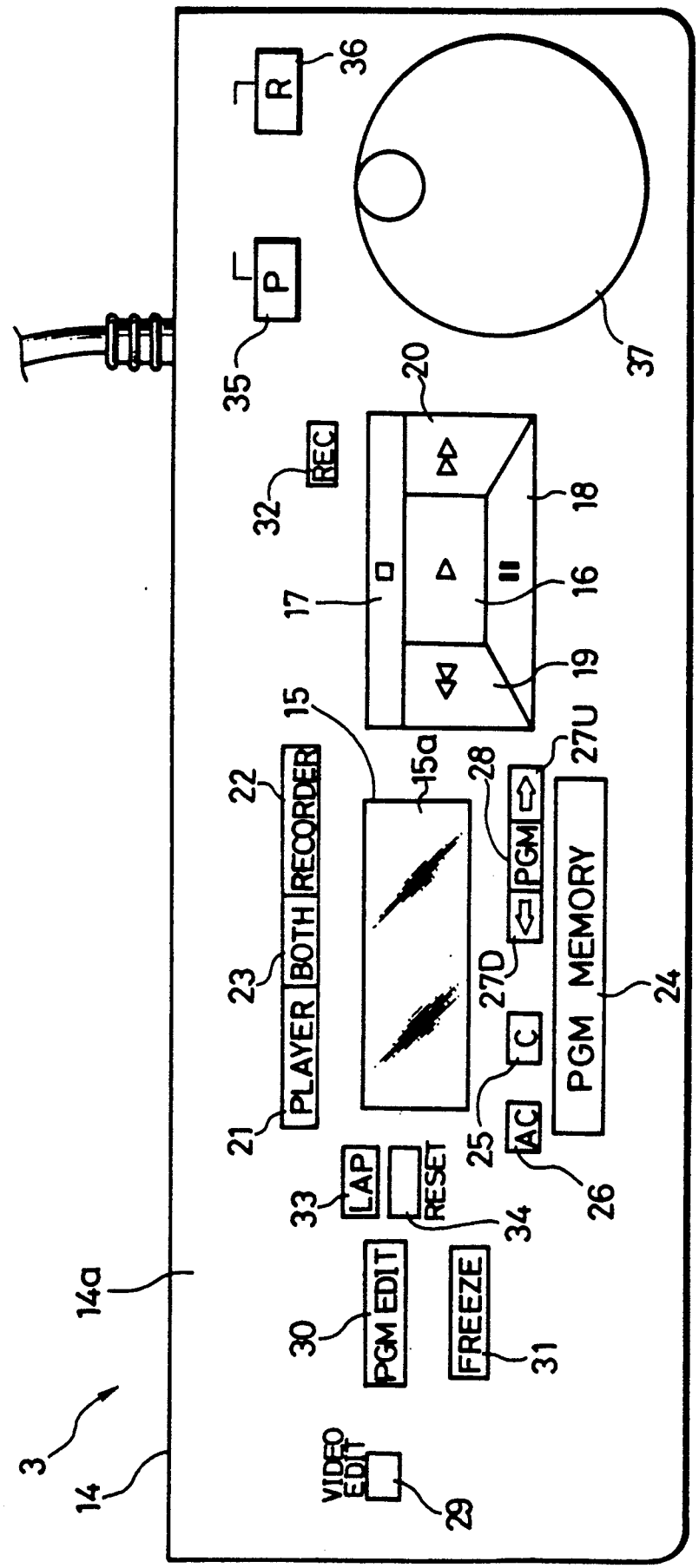
FIG. 3 is a plan view of the keyboard illustrated in FIG. 2.

Keyboard 3, which is shown in greater detail in FIG. 3, is comprised of a housing 14 having a top wall 14a on which are disposed various keyboard switches 16-36 and a jog dial 37. An alphanumeric display 15 also is provided on top wall 14a, and this alphanumeric display preferably is a liquid crystal display device having a display screen 15a.

The function of the respective keyboard switches, or pushbuttons, now will be described in conjunction with the plan view thereof of FIG. 3. Pushbuttons 16-20 are adapted, when operated, to establish a respective operating mode of the video playback unit or the video recording unit, whichever unit is selected (as will be described). Pushbutton 16 is the play button to initiate the playback of video signals from the video playback unit or from the video recording unit. Additionally, if the video recording unit is disposed in its recording mode, the operation of play pushbutton 16 initiates the recording operation. Pushbutton 17 is the stop button which, when operated, stops the operation of the video playback and/or recording unit. Pushbutton 18 is the pause button which, when operated, interrupts, or temporarily stops, whatever operation is being carried out by the video playback and/or video recording unit. Pushbuttons 19 and 20 are rewind and fast-forward buttons and are adapted to effect a high speed tape search operation, whereby the tape in video cassette 5 or the tape in video cassette 6 is moved in the reverse or forward direction at a relatively high speed. This so-called high speed search operation is carried out when the operator wishes to access a desired location on the video tape.

Pushbuttons 21-23 constitute selector buttons for selecting the video playback unit or the video recording unit, or both units, to be controlled in response to the operation of pushbuttons 16-20. Pushbutton 21, when operated, selects the video playback unit to be controlled in response to pushbuttons 16-20. For the purpose of the present discussion, it is recognized that, when the video playback unit is selected, previously recorded video signals may be reproduced but additional video signals are not recorded on the video tape used with that unit. The actuation of pushbutton 22 selects the video recording unit for operation under the control of pushbuttons 16-20. It is appreciated that video signals may be recorded or reproduced on the video tape used with the video recording unit. Finally, the actuation of pushbutton 23 selects both the video playback unit and the video recording unit to be controlled in response to pushbuttons 16-20. For example, if both units are selected for operation and if pushbutton 16 is actuated, video signals are reproduced by the video playback unit and these video signals are transferred to and recorded by the video recording unit.

Program memory pushbutton 24 is adapted, when operated, to enter into a memory various tape locations on, for example, the original tape being played by the video playback unit. Each time the program memory pushbutton is actuated, a tape location indication, such as a time code, a tape count or the like, representing the location of the video tape then being reproduced by the video playback unit is entered into the memory. Typically, an operator would actuate program memory pushbutton 24 to store start and stop locations of the original tape, thus designating those segments thereon to be transferred to the edit tape. The start location on the edit tape also may be stored in the memory.

Pushbutton 25 is operable as a clear button which, when actuated, clears from the memory the immediately preceding tape location identification (time code) that had been stored therein in response to the operation of program memory pushbutton 24. An all-clear pushbutton 26 is adapted to clear from the memory all tape location identifications that had been entered therein. Thus, when pushbutton 26 is actuated, the identification of all segments on the original tape which had been programmed into the memory are deleted. Pushbuttons 27u and 27d are identified as order-designating buttons and are adapted, when actuated, to modify the sequential order of those segments on the original tape whose locations have been stored in the memory. Thus, notwithstanding the order in which those segments are stored, operation of the order-designating pushbuttons facilitates a modification in that order such that the operator may vary the sequence in which such segments are reproduced from the original tape and transferred to the edit tape. Pushbutton 28 acts as a program input button and, when operated, enters into the memory the modified order of segment reproduction preliminarily established by operator-actuation of order-designating pushbuttons 27u and 27d. For example, each time program memory pushbutton 24 is actuated, the tape location identification, or time code, is displayed on LCD display screen 15a. Once all of these time codes are displayed as start and stop codes, thus identifying the segments to be reproduced from the original tape, the operator may actuate order-designating buttons 27u and 27d to vary the displayed order in which these segments will be played back. When the operator determines that the displayed playback order is acceptable, program input pushbutton 28 is operated to "fix" this order in the memory.

A video edit button 29 is adapted to be actuated to begin a video transfer operation from the original tape to the edit tape. Typically, both the video playback unit and the video recording unit are disposed in their pause modes, with the original tape positioned at the beginning of the segment to be transferred and with the edit tape positioned at the location to begin receiving the transferred video signals. When the video edit pushbutton is actuated, the video playback and recording units commence operation to transfer the video signals from the original tape to the edit tape.

A program edit pushbutton 30 is adapted, when actuated, to initiate the transfer of all segments which have been programmed into the aforementioned memory by the operation of program memory pushbutton 24 and program input pushbutton 28, as aforesaid. The program edit pushbutton thus effects an automatic transfer of segments in the order selected by the operator.

A freeze pushbutton 31 is adapted, when actuated, to record on the edit tape a still picture derived from video signals on the original tape. Typically, one frame of the still picture is recorded repetitively on the edit tape such that, during later playback of the edit tape, a still picture may be displayed therefrom without stopping or pausing the edit tape. A running-edit pushbutton 32 (located in the right half section of keyboard 3) serves to record on the edit tape the video signals reproduced from the original tape at the time the pushbutton is operated. For example, a video picture derived from the original tape may be observed on monitor 13 by the operator; and when a desired video picture is displayed, he may operate running-edit pushbutton 32 to transfer the video signals reproduced thereafter from the original tape.

A lap pushbutton 33 is operable to display on, for example, LCD display device 15, the total time duration of those segments which have been selected for editing. As one example, prior to an edit operation, once segments have been selected by operator actuation of program memory pushbutton 24 and program input pushbutton 28, the operation of lap pushbutton 33 effects a display of the total amount of time consumed by all of these selected segments. As another example, the operation of the lap pushbutton results in the display of the total amount of time of those segments which have already been transferred from the original tape to the edit tape.

A reset pushbutton 34 is adapted, when actuated, to reset the lap count, or time, displayed by LCD device 15 when lap pushbutton 33 is actuated. The reset pushbutton thus acts in a manner analogous to a counter reset button.

Picture switching pushbuttons 35 and 36 are operable to reverse the video content of the main and sub-pictures. For example, when pushbutton 35 is actuated, the video signals reproduced from the original tape are used to display the main picture and the video signals reproduced from the edit tape are used to display the sub-picture insert therein. When pushbutton 36 is actuated, the main picture is derived from the video signals reproduced from the edit tape and the sub-picture insert is derived from the video signals reproduced from the original tape. The operator thus may use these pushbuttons to observe the details of video information reproduced from the original tape or from the edit tape, thus enabling the operator to better determine which segment is to be transferred to the desired location.

Jog dial 37 is manually operable to advance either the original tape or the edit tape incrementally in the forward or reverse direction so as to display a corresponding video picture on a frame-by-frame basis. The direction and speed of tape advance and, thus, picture advance is determined by the direction and magnitude of rotation of the jog dial.

Figure 4B:
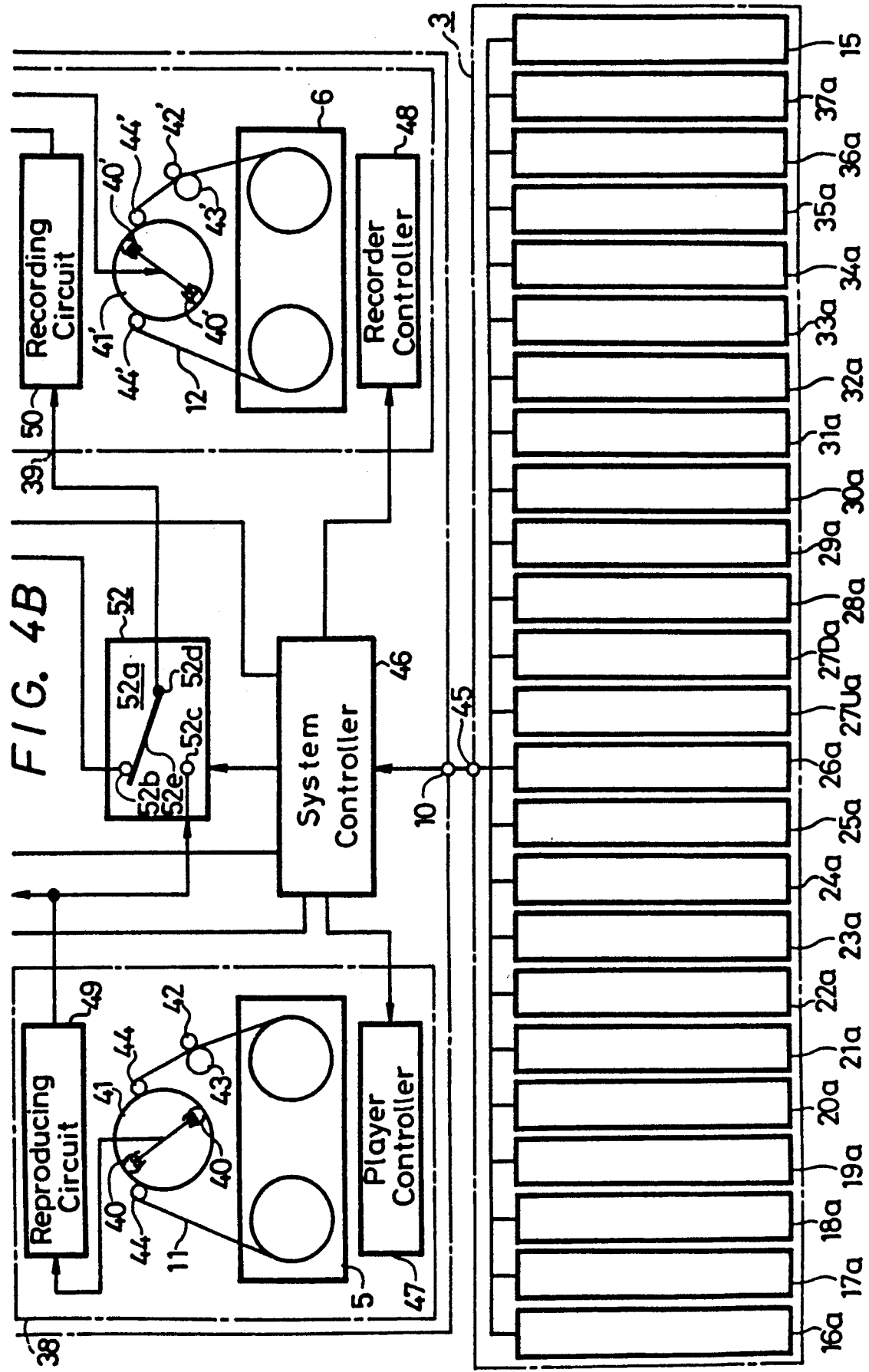

Referring now to FIGS. 4A and 4B, there is illustrated a block diagram of the video editing apparatus, and particularly the dual video recording/reproducing apparatus of the present invention. Like reference numerals are used in FIGS. 4A and 4B to identify those elements which have been discussed above. FIG. 4B particularly represents the respective pushbuttons included in keyboard 3 as switch elements, each identified with the suffix "a" used with the reference numeral shown in FIG. 3. Jog dial 37 also is illustrated as a simple switch element 37a; and LCD display 15 is depicted simply as a rectangle. The block diagram includes video playback unit 38, video recording unit 39, system controller 46, selector switch 52, a mixer or combining circuit 53, a sub-picture signal former 55 and a supply circuit 63. Video playback unit 38 and video recording unit 39 are similar in that each is adapted to receive a respective one of video cassettes 5 and 6 for reproducing signals therefrom. Those elements included in the video playback and recording units which are similar are identified by the same reference numerals, and to distinguish one from the other, the reference numerals used in conjunction with video recording unit 39 are primed. Thus, rotary magnetic heads 40 are supported on a drum 41 to scan successive oblique tracks across the video tape deployed about the drum by tape loading posts 44. To distinguish between the original and edit tapes, FIG. 4B illustrates the original tape as tape 11 and the edit tape as tape 12. A capstan 42 cooperates with a pinch roller 43 to transport the tape between reels within the video cassette, as is conventional. The manner in which the video tape is loaded and transported, and the manner in which video signals are recorded and reproduced are conventional, and no further description is provided herein.

The operation of video playback unit 38 is controlled by a player controller 47 included therein, this player controller receiving control signals from system controller 46. A reproducing circuit 49 is coupled to magnetic heads 40 of the video playback unit and operates to reproduce the video signals played back from original tape 11. Reproducing circuit 49 is coupled to selector switch 52, combining circuit 53 and supply circuit 63. In addition, the video signals reproduced by reproducing circuit 49 are coupled to an output terminal, or tap, 68 to enable those video signals to be supplied to further apparatus (not shown) if desired.

In a similar manner, video recording unit 39 includes a recorder controller 48 which is adapted to control the recording/reproducing operation of the recording unit in a manner known to those of ordinary skill in the art. Recorder controller 48 responds to control signals supplied thereto by system controller 46.

Video recording unit 39 includes a recording circuit 50 and a reproducing circuit 51, both coupled to magnetic heads 40' for the purpose of recording and reproducing signals, respectively, on edit tape 12. Recording circuit 50 includes an input coupled to selector switch 52 and an output coupled to magnetic heads 40'. Reproducing circuit 51 includes an input coupled to magnetic heads 40' and an output coupled to sub-picture signal former supply circuit 63 and to an output tap 69.

Sub-picture signal former 55 is adapted to produce video signals to be displayed on a monitor, such as monitor 13, as a picture-in-a-picture insert on a main picture. These sub-picture video signals thus are capable of producing a sub-picture of reduced size and of a particular position relative to the main picture. In one embodiment thereof, sub-picture signal former 55 includes an analog-to-digital (A/D) converter 56, a memory 57, a digital-to-analog (D/A) converter 58 and a memory controller 59. A/D converter 56 is adapted to digitize analog video signals supplied thereto, such as by sampling each horizontal line interval of the video signals and converting each sample to a multi-bit digital signal. A/D converter 56 is coupled to memory 57 which, under the control of memory controller 59, writes the digitized video signals supplied thereto into particular addresses determined by the memory controller. To reduce the size of the sub-picture derived from sub-picture signal former 55, memory controller 59 is adapted to control memory 57 such that only selected digitized samples are written into the memory. For example, every nth sample in every mth line may be written into the memory. Alternatively, every sample in each line may be stored in memory 57, but memory controller 59 may control the reading out of the stored samples such that every nth sample in every mth line is read. It is appreciated that the memory controller determines not only the addresses of memory 57 into and from which digitized samples are stored, but also controls the memory to carry out a read or write operation. Those samples read from memory 57 are supplied to D/A converter 58 whereat they are reconverted back to analog form.

A/D converter 56 includes an input coupled to supply circuit 63 for receiving video signals from the supply circuit D/A converter 58 includes an output coupled to combining circuit 53 and also to selector switch 52, for a purpose soon to be described. Memory controller 59 is coupled to system controller 46 and operates under the control of the system controller to determine the addresses into which digitized samples are written and from which digitized samples are read. The system controller also controls memory controller 59 to select a memory read or memory write operation.

Combining circuit 53 is coupled to system controller 46 and is adapted to respond to control signals either to combine a main picture signal supplied thereto by supply circuit 63 with a sub-picture signal supplied by sub-picture signal former 55 to produce a display signal, or simply to produce a display signal directly from the main picture signal supplied thereto. The output of combining circuit 53 is coupled to a video output terminal 54 which, as illustrated, is connected to monitor 13 for the purpose of displaying the display signal produced by the combining circuit. Thus, either a main picture will be displayed, or a picture-in-a-picture comprised of a sub-picture insert into the main picture will be displayed, depending upon the control signal supplied from system controller 46 to combining circuit 53. As will be described below, the main picture signal may be derived from reproducing circuit 49 or from reproducing circuit 51, whereas the sub-picture signal is derived solely from sub-picture signal former 55. However, as will also be described, the sub-picture signal may be derived either from the video signals produced by reproducing circuit 49 or those produced by reproducing circuit 51. Supply circuit 63 determines the particular circuits to which the signals reproduced from the original tape and those reproduced from the edit tape are supplied.

For simplicity, supply circuit 63 is illustrated as a dual change-over switch having inputs 65a and 65b, outputs 64a and 64b, and movable selectors 66a and 66b. In one condition, selector 66a of the change-over switch connects input terminal 65a with output terminal 64a, while selector 66b connects input terminal 65b to output terminal 64b. In another condition of the dual change-over switch, selector 66a couples input terminal 65a to output terminal 64b while selector 66b couples input terminal 65b to output terminal 64a. Input terminal 65a is coupled to reproducing circuit 49 and input terminal 65b is coupled to reproducing circuit 51. Output terminal 64a is coupled to combining circuit 53 to supply the main picture signal thereto and output terminal 64b is coupled to A/D converter of sub-picture signal former 55. Supply circuit 63 is coupled to system controller 46 and the condition of the dual change-over switch is determined by a control signal supplied from the system controller to the supply circuit. It is recognized that, in the second-mentioned condition of the change-over switch, the video signals reproduced by reproducing circuit 49 are coupled to sub-picture signal former 55 and the video signals reproduced by reproducing circuit 51 are supplied as the main picture signals to combining circuit 53.

Selector switch 52 is illustrated as a simple switch having an output 52d coupled to recording circuit 50 of recording unit 39. The selector switch also is illustrated as including a fixed terminal 52b coupled to the output of D/A converter 58 of sub-picture signal former 55 and another fixed terminal 52c coupled to the output of reproducing circuit 49 of video playback unit 38. A selector 52e is used to couple output terminal 52d to either of input terminals 52b and 52c. System controller 46 is coupled to selector switch 52 and is adapted to supply a control signal to determine which input terminal is coupled to output terminal 52d.

When selector switch 52 is controlled by system controller 46 such that input terminal 52b is coupled to output terminal 52d, the contents of memory 57, after being converted to analog form, are recorded on edit tape 12. This is referred to herein as a still picture edit operation. Typically, memory 57 stores a frame of video signals which, in the usual operation, is a frame reproduced from the original tape by reproducing circuit 49 of video playback unit 38. Such still picture editing operation is selected by operator-actuation of freeze pushbutton 31 (FIG. 3).

In the still picture edit operation, the frame reproduced from the original tape is stored in memory 57 and then read therefrom under the control of memory controller 59, converted to analog form by D/A converter 58 and supplied to recording circuit 50 of video recording unit 39 by selector switch 52. The stored frame is read repeatedly and recorded in successive tracks on edit tape 12 by recording circuit 50 and magnetic heads 40'. Thus, the same frame is recorded successively along a length of edit tape 12 until, for example, freeze pushbutton 31 is operated once again or until some other action is taken by the operator to terminate this still picture edit operation.

When system controller 46 supplies a suitable "standard" edit control signal to selector switch 52, input terminal 52c is coupled to output terminal 52d, thereby connecting the output of reproducing circuit 49 to the input of recording circuit 50. It is seen that in this "standard" edit mode, those video signals which are reproduced from the original tape are transferred to and recorded on the edit tape. Accordingly, selector switch 52 is controllable by system controller 46 in response to the operation of keyboard 3 to establish either a "standard" or still picture edit mode of operation.

As mentioned above, sub-picture signal former 55 is adapted to produce sub-picture signals for the purpose of superimposing a sub-picture insert on the main picture displayed by monitor 13. That the sub-picture insert is reduced in size relative to the main picture has been discussed above; and one technique for reducing the size of the sub-picture insert has been mentioned. In accordance with an advantageous feature of this invention, the location of the sub-picture insert is controlled such that the operator, upon visual observation of the picture displayed on monitor 13, is apprised of whether the sub-picture is derived from the original tape or from the edit tape. Depending upon when the contents of memory 57 are read therefrom relative to the scanning of the original or edit tape during a signal reproducing mode, the position of the sub-picture insert is established. For example, if memory controller 59 reads the contents of memory 57 at a time that is only slightly delayed from scanning the beginning of a frame picked up from video tape, the sub-picture insert is displayed at the upper left portion of the main picture, such as depicted by sub-picture insert 61 in main picture 62 of display 60b. Conversely, if memory controller 59 reads out the contents of memory 57 at a time that is substantially delayed relative to scanning the beginning of a frame picked up from video tape, the sub-picture insert is displayed at the upper right portion of the main picture.

This is illustrated in display 60a wherein sub-picture insert 62 is positioned at the upper right portion of main picture 61. Preferably, display 60a is provided when the video signals derived from the original tape constitute the main picture; and display 60b is produced when the video signals derived from the edit tape are displayed as the main picture. Thus, when the sub-picture is positioned at the right side of the display, the original tape is used to produce the main picture; and, conversely, when the sub-picture is located at the left side of the display, the edit tape is used to produce the main picture. The operator thus is enabled to discern which video tape is used to produce which picture. In the absence of confusion, the edit operation is facilitated.

The operation of the video editing apparatus illustrated in FIGS. 4A and 4B now will be described. Initially, let it be assumed that a manual edit operation is carried out. That is, video information reproduced from the original tape by video playback unit 38 is transferred for recording on the edit tape by video recording unit 39 when the operator observes information which he desires to transfer. First, pushbutton 22 (FIG. 3) is actuated to condition video recording unit 39 for operation. Edit tape 12 may be transported for a video signal playback operation when pushbutton 16 is actuated. Alternatively, pushbutton 19 or pushbutton 20 may be actuated to carry out a high-speed search of the edit tape.

Still further, jog dial 37 may be operated to advance the edit tape on a frame-by-frame basis.

In response to the actuation of pushbutton 22, supply circuit 63 is changed over such that input terminal 65a is connected to output terminal 64b and input terminal 65b is connected to output terminal 64a. It is appreciated that system controller 46 responds to the actuation of pushbutton 22 to supply a suitable control signal to supply circuit 63 to condition it to this configuration. In this state, video signals picked up from edit tape 12 by reproducing circuit 51 of video recording unit 39 are supplied as the main picture signals to combining circuit 53 for display on monitor 13. The operator thus may observe the information content of the edit tape now being played back.

At this time, video playback unit 38 is not conditioned to carry out a playback operation and, thus, video signals are not supplied from reproducing circuit 49 to supply circuit 63. Hence, monitor 13 displays only the main picture derived from the edit tape and no sub-picture is inserted or superimposed onto the main picture. Although input terminal 65a now is connected to output terminal 64b of supply circuit 63, no video signals are coupled to this output terminal because none are supplied to the input terminal.

When the operator observes on monitor 13 a picture derived from edit tape 12 suitable for the insertion of video information from the original tape, pause pushbutton 18 (FIG. 3) is actuated. Video recording unit 39 thus is disposed in its pause or quiescent mode. If, while the video recording unit is in its pause mode, picture switching pushbutton 35 is actuated, the source of the main and sub-pictures is reversed That is, system controller 46 responds to the actuation of pushbutton 35 to change over supply circuit 63 such that input terminal 65a is connected to output terminal 64a and input terminal 65b is connected to output terminal 64b. This would produce the main picture in response to video signals played back from original tape 11. However, in accordance with the example described herein, no signals are played back at this time from the original tape.

Nevertheless, assuming that pushbutton 35 is operated to change over supply circuit 63, as aforesaid, if the operator now actuates pushbutton 21, system controller 46 supplies a control signal to player controller 47 of video playback unit 38 to condition reproducing circuit 49 to recover video signals played back from original tape 11. The original tape may be transported for a signal playback operation by actuating pushbutton switch 16. Alternatively, the original tape may be scanned by actuating pushbutton switches 19 or 20. As yet a further alternative, the original tape may be advanced on a frame-by-frame basis by operating jog dial 37. In any event, the video signals now reproduced from the original tape are supplied to input terminal 65a of supply circuit 63 and coupled from output terminal 64a of the supply circuit to combining circuit 53. These video signals constitute the main picture signals; and the main picture reproduced from the original tape is displayed on monitor 13. The operator now may observe the video information reproduced from the original tape until a desired starting point for the edit operation is reached. At that time, the operation of pause button 18 disposes video playback unit 38 in its pause mode.

At this time, both the video playback and video recording units are in their respective pause modes. If the operator wishes to confirm that the starting point on the edit tape for receiving transferred video information is satisfactory, he may actuate pushbutton switch 36 which changes over the condition of supply circuit 63. Then, if jog dial 37 is operated, edit tape 12 is moved incrementally, on a frame-by-frame basis, and video signals are reproduced from edit tape 12 by reproducing circuit 51 and supplied as the main picture signals to combining circuit 53 by supply circuit 63. The user thus may observe the video content of the edit tape, frame-by-frame.

Now, assuming that original tape 11 and edit tape 12 are disposed at their desired locations for adding the video information now played back from the original tape onto the edit tape, video edit button 29 is actuated. System controller 46 responds to the actuation of this pushbutton to control player controller 47 and recorder controller 48 such that the video signals now reproduced from original tape 11 by reproducing circuit 49 are coupled through selector switch 52 to recording circuit 50 of video recording unit 39 and recorded thereby on edit tape 12. This transfer operation continues until the operator terminates this edit operation, as by actuating stop pushbutton 17.

The foregoing operation may be repeated, as desired. Thus, original tape 11 and edit tape 12 first are positioned at their respective locations suitable for transferring video signals from the original tape to the edit tape. Although the foregoing has described the positioning of edit tape 12 prior to the positioning of the original tape, it will be appreciated that this operation may be interchanged. In any event, the operator observes on monitor 13, as the main picture, the video information reproduced from the original tape or that reproduced from the edit tape simply by actuating one or the other of pushbuttons 35 and 36. Hence, the desired locations at which editing should begin are easily determined.

The manner in which a programmed edit operation is carried out now will be described. As before, the location on edit tape 12 to which video information is to be transferred from original tape 11 first is found, as was discussed above. Once this location is observed, video recording unit 39 is disposed in its pause mode, as by operating pause pushbutton 18.

Thereafter, those segments on original tape 11 which should be transferred to edit tape 12 are located and identified. When the beginning of a desired segment recorded on original tape 11 is reached, the pause pushbutton may be operated and program memory pushbutton 24 is actuated. In the preferred embodiment wherein time codes are recorded on the original tape, the operation of program memory pushbutton 24 serves to write the time code identifying the starting location of this segment into a suitable memory (not necessarily memory 57) and to display it on LCD 15.

The operator then resumes a playback operation for video playback unit 38, as by actuating pause pushbutton 18 once again, whereupon the selected segment on original tape 11 is played back and displayed. When the end point of this segment is reached, pause pushbutton 18 is actuated once more, thereby disposing the video playback unit in its pause mode. The operator next actuates program memory pushbutton 24 to write the time code identifying this end point into the memory and to display it on LCD 15.

The foregoing operation may be repeated several times, thereby writing into the memory the start and stop points of each segment desired to be transferred from original tape 11 to edit tape 12. If the operator wishes to delete a segment or change its start and stop location from the memory, clear pushbutton 25 or all-clear pushbutton 26 may be actuated. As mentioned above, the last-entered time code is deleted from the memory when pushbutton 25 is operated. All time codes that had been written into the memory are deleted when pushbutton 26 is actuated. Furthermore, should the operator wish to vary the order in which the selected segments are transferred from original tape 11 to edit tape 12, order-designating pushbuttons 27u and 27d are operated.

Once the operator is satisfied with the segments selected for re-recording onto the edit tape, program edit pushbutton 30 is actuated to initiate the transfer of those segments from the original tape to the edit tape. Thus, video playback unit 38 operates the tape transport mechanism to search original tape 11 until the time code identifying the start location of the first segment to be transferred is found. Tapes 11 and 12 then are advanced at their normal playback and recording speeds, respectively, and signals reproduced from the original tape are supplied from reproducing circuit 49 to recording circuit 50 of video recording unit 39 via selector switch 52 for recording on edit tape 12. When the time code identifying the stop location of the segment being recorded is reached, this transfer operation terminates and player controller 47 now controls the transport mechanism in video playback unit 38 to search original tape 11 for the next segment to be transferred. In this manner, the original tape is searched for segments which had been selected previously for transfer to edit tape 12; and when each segment is reached in the desired order of transfer, video signals are reproduced from the original tape and transferred to and recorded on the edit tape.

Figure 5:
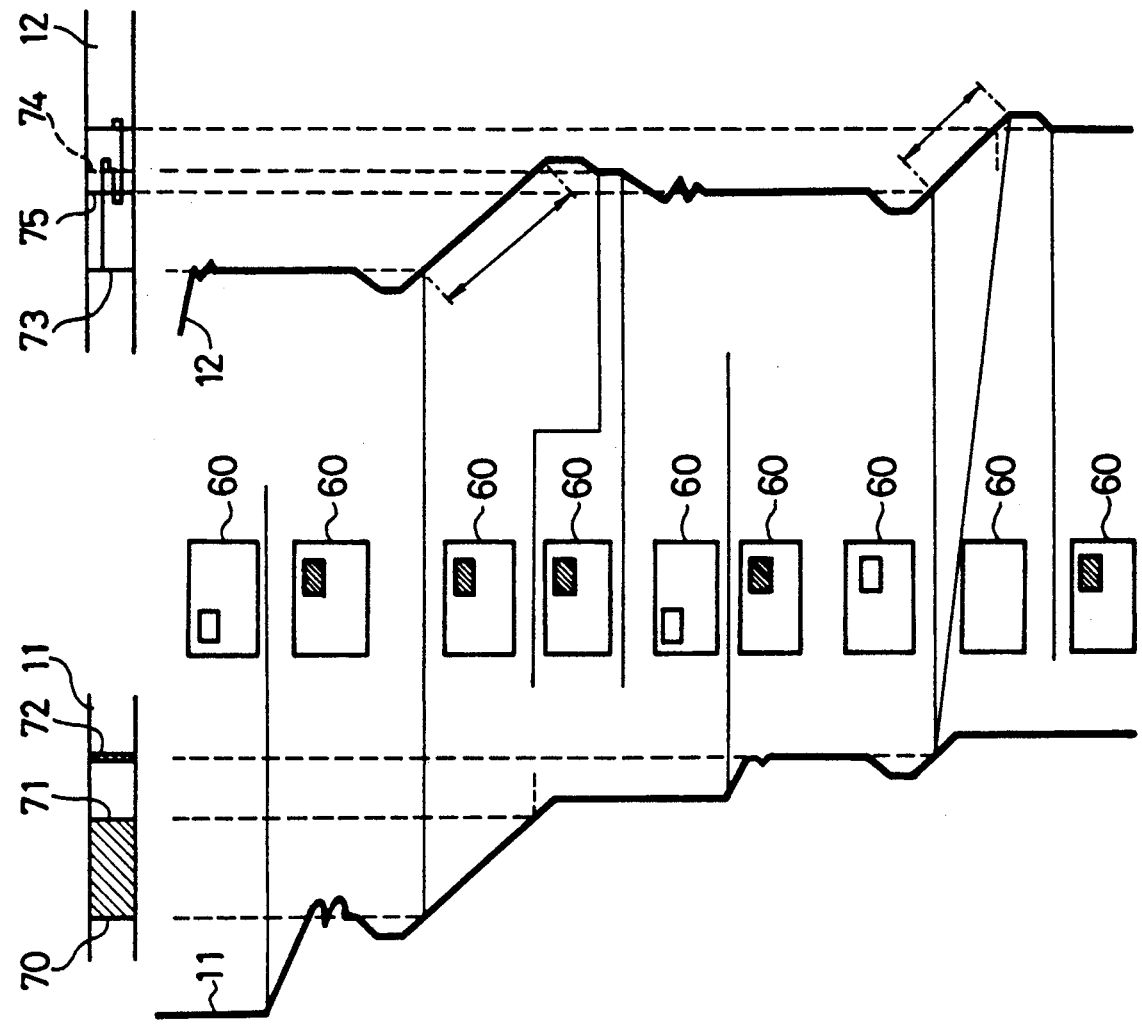
FIG. 5, consisting of A-E, is a timing diagram useful in understanding how an editing operation is carried out by the present invention.
Figure 5:
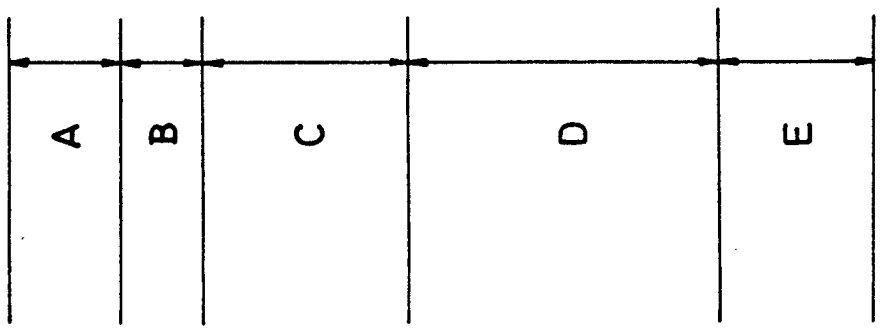

The manner in which a typical edit operation is carried out over time can best be appreciated by referring to the timing diagram illustrated in FIG. 5. The progress of time is represented by the vertical direction shown in FIG. 5; and the movement of the original and edit tapes is represented by the horizontal direction. For the purpose of this discussion, it is assumed that a so-called "moving" picture is reproduced from original tape 11 and transferred to edit tape 12, followed by the reproduction and transfer of a "still" picture. The segment of the moving picture to be transferred begins at starting point 70 and ends at starting point 71; and the segment, or single frame, of the still picture on original tape 11 is identified by reference numeral 72. The moving picture segment is transferred to and recorded on edit tape 12 at starting point 73; and the still picture is recorded on the edit tape beginning at starting point 75.

Let it be assumed that the time codes identifying starting point 70 and end point 71 had been written into the memory by operation of program memory pushbutton 24, as aforesaid. Let it be further assumed that the time code identifying starting point 73 on edit tape 12 also has been stored. Now, when program edit pushbutton 30 is actuated, edit tape 12 first is advanced until the time code identifying starting point 73 is located. It is expected that edit tape 12, when stopped, will overshoot starting point 73, such as may be due to inertia of the tape transport mechanism. Accordingly, recorder controller 48 of video recording unit 39 gradually decreases the rotation of capstan 42' so as to slow the tape gradually. Furthermore, capstan 42' and the remaining tape transport mechanism is controlled to move edit tape 12 back and forth until starting point 73 is located precisely. At this location, recording heads 40' scan tape 12 at the very beginning of a record track. Tape 12 now is properly positioned to begin the recording of a segment to be transferred thereto from original tape 11.

While edit tape 12 is positioned, as aforesaid, original tape 11 remains stationary. This positioning of tape 12 while holding tape 11 still is represented by interval A in FIG. 5. Now, original tape 11 is advanced to locate starting point 70; and while tape 11 is moved, tape 12 remains stopped.

Player controller 47 controls the tape transport mechanism of video playback unit 38 in much the same way as recorder controller 48 controls the tape transport mechanism of the video recording unit. Hence, the operation of capstan 42 is controlled to gradually slow tape 11 until starting point 70 is reached. Because of expected overshoot, tape 11 thereafter is moved forward and backward until starting point 70 is located precisely. At that time, playback heads 40 are brought into contact with tape 11 at the beginning of a record track at starting point 70. This control over tape 11 is represented by interval B.

Now that tape 11 is positioned precisely at starting point 70 and tape 12 is positioned precisely at starting point 73, the tape transport mechanisms in video playback unit 38 and in video recording unit 39 operate concurrently to transfer the desired segment from the original tape to the edit tape. This is carried out by first rewinding the original and edit tapes by a predetermined amount. Then, after "pre-rolling" the tapes, they are advanced simultaneously in the forward direction. The amount of pre-roll is selected to bring both tapes up to stable operating speed before video signals are transferred. Once tapes 11 and 12 resume their forward movements, starting point 70 on tape 11 and starting point 73 on tape 12 are reached simultaneously. At that time, the video signals reproduced from original tape 11 are transferred by selector switch 52 to recording circuit 50 and are recorded on edit tape 12. This transfer of the selected segment continues until end point 71 on tape 11 is reached. At that time, end point 74 on tape 12 is reached. The transfer operation then terminates and video signals no longer are recorded on the edit tape. This transfer operation is represented by interval C.

Let it be assumed that the still picture located at starting point 72 on original tape 11 is to be recorded at starting point 75 of edit tape 12. Let it be further assumed that starting point 75 lies between starting point 73 and end point 74 of the segment just transferred to the edit tape. Accordingly, in anticipation of recording on the edit tape the still picture segment to be reproduced from the original tape, video playback unit 38 is stopped while video recording unit 39 operates to rewind tape 12 from end point 74 to point 75. Once starting point 75 is reached, including the back and forth movement of tape 12 to precisely position the tape at this starting point, the edit tape is stopped and original tape 11 is advanced to starting point 72, the location at which is recorded the frame constituting the still picture. Here too, tape 11 is transported back and forth about starting point 72 so as to locate the tape precisely at that point. At this time, original tape 11 is positioned precisely at starting point 72 and edit tape 12 is positioned precisely at starting point 75, as represented by interval D. The edit apparatus now is conditioned to carry out this next transfer operation.

As was described above in connection with the preceding transfer of video signals, tapes 11 and 12 are pre-rolled concurrently from their starting positions 72 and 75, and then the tapes are advanced simultaneously to ensure that, when starting points 72 and 75 are reached once again, both tapes are at their proper, stable operating speeds.

For the operation wherein a still picture is to be transferred to edit tape 12, freeze pushbutton 31 is actuated to change over supply circuit 63 such that input terminal 65a is connected to output terminal 64b. Thus, when the original tape is advanced to starting point 72, the video signals in the frame of the still picture are reproduced by reproducing circuit 49 and supplied by supply circuit 63 to sub-picture signal former 55. In particular, the video signals included in this frame are digitized and written into memory 57. Preferably, during this still picture edit operation, each digitized sample in each line is read from the memory, converted to analog form by D/A converter 58 and supplied by selector switch 52 to recording circuit 50 of video recording unit 39. Hence, the re-converted video signals are recorded on edit tape 12, commencing at starting point 75. It is appreciated that, in accordance with the present example, a single frame of video signals is stored in memory 57, but this frame is read from the memory repeatedly for recording in several successive tracks on edit tape 12. Since the same frame is recorded successively on the edit tape, a still picture is reproduced when this portion of the edit tape subsequently is played back. This repetitive recording of the same frame on the edit tape is carried out during interval E.

In FIG. 5, various video displays 60 are represented, each display corresponding to a particular main picture and sub-picture insert during the aforementioned operations. For example, during interval A, display 60 presents a main picture derived from edit tape 12. During interval B, the main picture of display 60 is derived from the original tape and a sub-picture insert derived from the edit tape also is displayed. During interval C, the main picture is derived from the video signals played back from original tape 11; and during the first portion of interval D, display 60 presents the main picture derived from the original tape and a sub-picture insert derived from the edit tape. During the second portion of interval D, the main picture is derived from the edit tape and the sub-picture insert is derived from the original tape. That the sub-picture insert is derived from the original tape will be appreciated from the representation that the sub-picture insert is located in the same relative position of the main picture as video playback unit 38 is located relative to main unit 2 (FIG. 2).

Continuing with displays 60, the main picture displayed during the third portion of interval D is derived from the original tape and the sub-picture insert is derived from the edit tape. During the first portion of interval E when both tapes are pre-rolled, the main picture is derived from the original tape and the sub-picture is derived from the edit tape. Then, when the still picture is recorded on edit tape 12, the main picture is derived from the frame stored in memory 57. Thereafter, if both tapes are disposed in their pause modes, the main picture of display 60 is derived from the original tape and the sub-picture insert is derived from the edit tape.

While the present invention has been particularly shown and described with reference to a preferred embodiment, it will be readily apparent to those of ordinary skill in the art that various changes and modifications may be made without departing from the spirit and scope of the invention. As described herein, the video editing system of the present invention is adapted to facilitate the location of desired segments of video information to be transferred from an original tape to an edit tape. The desired location on the edit tape to which the transferred segment is to be inserted likewise is easily discerned by providing a composite display of a main picture and a sub-picture on a single monitor. The sources of the main and sub-picture signals are easily controllable and interchangeable to permit an operator to verify the segment to be transferred from the original tape and the location on the edit tape to which the transferred segment is inserted. The location in the displayed main picture at which the sub-picture is inserted corresponds to the side in housing 4 at which the source of the sub-picture insert is located. For example, the sub-picture insert is located at the left side of the main picture when original tape 11 provides the source of the sub-picture signals. Conversely, the sub-picture insert is located at the right side of the displayed main picture when edit tape 12 provides the source of the sub-picture. It will be recognized that other locations may be used to discriminate the source of the displayed sub-picture insert, such as upper and lower insert locations or diagonally opposite insert locations, depending upon whether the original tape or the edit tape constitutes the source of the sub-picture.

As has also been described herein, combining circuit 53 is controllable so as to inhibit sub-picture signals supplied thereto from sub-picture signal former 55 from being inserted into the main picture displayed on monitor 13. System controller 46 may respond to the operation of keyboard 3 to carry out such inhibit operations.

By mixing the main and sub-picture signals to a single display signal, a standard television monitor can be used with the present invention. Stated otherwise, it is not necessary to connect an expensive, dual-picture video display device to main unit 2 in order to display the main picture and sub-picture insert.

Also, although keyboard 3 desirably is physically independent of main unit 2 and is connected thereto by a plug and socket arrangement, the keyboard may be an integral part of the main unit. Also, although a single job dial is used to advance either the original tape or the edit tape on a frame-by-frame basis, separate job dials may be provided, one for each tape. As yet another alternative, video playback unit 38 and video recording unit 39 may be separate, physically independent recording devices. Suitable connecting cables may be used to couple these separate recording devices to system controller 46, selector switch 52, combining circuit 53, sub-picture signal former 55 and supply circuit 63. These latter circuits may be disposed in a common housing, such as housing 4, with the separate video recorders disposed externally of that housing. Still further, although video playback unit 38 has been described herein simply as a video signal reproducing device, it is appreciated that this unit may be a video recorder/reproducer, although only the reproducing circuitry included therein is of interest to the present invention.

It is intended that the appended claims be interpreted as including the foregoing as well as other equivalents.

What is claimed is:

1. Dual video recording/reproducing apparatus, comprising:
a video playback unit;
a video recording unit including recording means for recording a video signal and reproducing means for reproducing a video signal;
supply means for supplying an output video signal from said video playback unit to the recording means of said video recording unit;
sub-picture signal forming means responsive to a video signal supplied thereto for deriving therefrom a sub-picture signal adapted to cause the display of a sub-picture insert in a main picture displayed on a video display;
switch means for receiving a video signal from said video playback unit and a video signal from the producing means of said video recording unit and selectively operative to couple one of said video signals to said sub-picture signal forming means and to couple the other of said video signals as a main picture signal;
control means for controlling the operation of said switch means; and
combining means for combining said sub-picture and main picture signals to form a display signal for displaying a main picture and a sub-picture insert;
said sub-picture signal forming means including means for locating said sub-picture insert in said main picture adjacent one side of said video display when said sub-picture signal is derived from a video signal from said video playback unit, and for locating said sub-picture insert in said main picture adjacent another side of said video display when said sub-picture signal is derived from a video signal from said reproducing means of the video recording unit, so that the source of the sub-picture signal is identified by the location of said sub-picture insert in the main picture.

2. The apparatus according to claim 1; wherein said sub-picture signal forming means includes an analog-to-digital converter for receiving a video signal, memory means for storing digital signals produced by said analog-to-digital converter and a digital-to-analog converter coupled to said memory means for receiving digital signals read therefrom; and wherein said means for locating the sub-picture insert in the main picture includes memory control means operative to control the time at which digital signals are read from said memory means.

3. The apparatus of claim 1, further comprising system control means coupled to said combining means for inhibiting the sub-picture signal from being combined with the main picture signal to form said display signal, whereby only a main picture is displayed from said display signal.

4. The apparatus of claim 1 further comprising a keyboard having a control key operative to supply a control signal to said control means and thereby determine which video signal is coupled by said switch means as said main picture signal and which video signal is coupled to said sub-picture forming means.

5. The apparatus of claim 4, further comprising a housing for containing the video playback and video recording units, sub-picture signal forming means, switch means, combining means and control means; and wherein said keyboard is physically separate from and not included in said housing.

6. Dual video recording/reproducing apparatus, comprising:
a video playback unit;

a video recording unit including recording means for recording a video signal and reproducing means for reproducing a video signal;

supply means for supplying an output video signal from said video playback unit to the recording means of said video recording unit;

sub-picture signal forming means responsive to a video signal supplied thereto for deriving therefrom a sub-picture signal adapted to cause the display of a sub-picture insert in a main picture displayed on a video display; said sub-picture signal forming means including an analog-to-digital-converter for receiving a video signal, memory means for storing digital signal produced by said analog-to-digital converter, a digital-to-analog converter coupled to said memory means for receiving digital signal read therefrom, and memory control means for controlling at least timing of the reading of digital signals from said memory means and thereby determining the location in said main picture at which the sub-picture is inserted;

switch means for receiving a video signal from said video playback unit and a video signal from the reproducing means of said video recording unit and selectively operative to couple one of said video signals to said sub-picture signal forming means and to couple the other of said video signals as a main picture signal;

combining means for combining said sub-picture and main picture signals to form a display signal for displaying a main picture and a sub-picture insert;

said switch means including first means for coupling the video signal from the reproducing means of said video recording unit to said analog-to-digital converter, while the output of said digital-to-analog converter is supplied as said sub-picture signal to said combining means, and second means for coupling the video signal from said video playback unit to said combining means as said main picture signal;

control means for controlling the operation of said switch means; and a housing for containing the video playback and video recording units, sub-picture signal forming means, switch means, combining means and control means.

7. The apparatus of claim 6 wherein said video playback unit is disposed at a first side in said housing and said video recording unit is disposed at an opposite side in said housing; and wherein said memory control means reads the digital signals from said memory means at a time relative to the main picture signal such that the sub-picture is inserted in the main picture at a location corresponding to the side in said housing at which the video recording unit is disposed.

8. Dual video recording/reproducing apparatus, comprising:

a video playback unit;

a video recording unit including recording means for recording a video signal and reproducing means for reproducing a video signal;

supply means for supplying an output video signal from said video playback unit to the recording means of said video recording unit;

sub-picture signal forming means responsive to a video signal supplied thereto for deriving therefrom a sub-picture signal adapted to cause the display of a sub-picture insert in a main picture displayed on a video display; said sub-picture signal forming means including an analog-to-digital-converter for receiving a video signal, memory means for storing digital signal produced by said analog-to-digital converter, a digital-to-analog converter coupled to said memory means for receiving digital signal read therefrom, and memory control means for controlling at least timing of the reading of digital signals from said memory means and thereby determining the location in said main picture at which the sub-picture is inserted;

switch means for receiving a video signal from said video playback unit and a video signal from the reproducing means of said video recording unit and selectively operative to couple one of said video signals to said sub-picture signal forming means and to couple the other of said video signals as a main picture signal;

combining means for combining said sub-picture and main picture signals to form a display signal for displaying a main picture and a sub-picture insert;

said switch means including first means for coupling the video signal from the video playback unit to said analog-to-digital converter, while the output of said digital-to-analog converter is supplied as said sub-picture signal to said combining means, and second means for coupling the video signal from said reproducing means of the video recording unit to said combining means as said main picture signal;

control means for controlling the operation of said switch means; and a housing for containing the video playback and video recording units, sub-picture signal forming means, switch means, combining means and control means.

9. The apparatus of claim 8 wherein said video playback unit is disposed at a first side in said housing and said video recording unit is disposed at an opposite side in said housing; and wherein said memory control means reads the digital signals from said memory means at a time relative to the main picture signal such that the sub-picture is inserted in the main picture at a location corresponding to the side in said housing at which the video recording unit is disposed.

10. Dual video recording/reproducing apparatus, comprising:

a video playback unit;

a video recording unit including recording means for recording a video signal and reproducing means for reproducing a video signal;

supply means for supplying an output video signal from said video playback unit to the recording means of said video recording unit;

sub-picture signal forming means responsive to a video signal supplied thereto for deriving therefrom a sub-picture signal adapted to cause the display of a sub-picture insert in a main picture displayed on a video display; said sub-picture signal forming means including an analog-to-digital-converter for receiving a video signal, memory means for storing digital signal produced by said analog-to-digital converter, a digital-to-analog converter coupled to said memory means for receiving digital signal read therefrom, and memory control means operative to control the writing of a selected portion of digital signals from said analog-to-digital converter in said memory means to reduce the size of the sub-picture relative to said main picture, said memory control means being further operative to control timing of the reading of digital signals from said memory means and thereby determining the location in said main picture at which the sub-picture is inserted;

switch means for receiving a video signal from said video playback unit and a video signal from the reproducing means of said video recording unit and selectively operative to couple one of said video signals to said sub-picture signal forming means and to couple the other of said video signals as a main picture signal;

combining means for combining said sub-picture and main picture signals to form a display signal for displaying a main picture and a sub-picture insert;

control means for controlling the operation of said switch means; and a housing for containing the video playback and video recording units, sub-picture signal forming means, switch means, combining means and control means.

11. Dual video recording/reproducing apparatus, comprising:

a video playback unit;

a video recording unit including recording means for recording a video signal and reproducing means for reproducing a video signal;

supply means for supplying an output video signal from said video playback unit to the recording means of said video recording unit;

sub-picture signal forming means responsive to a video signal supplied thereto for driving therefrom a sub-picture signal adapted to cause the display of a sub-picture insert in a main picture displayed on a video display; said sub-picture signal forming means including an analog-to-digital-converter for receiving a video signal, memory means for storing a frame of digitized video signals produced by said analog-to-digital converter, a digital-to-analog converter coupled to said memory means for receiving digital signal read therefrom, and memory control means for controlling at least reading of digital signals from said memory means;

supply means for supplying an output video signal from said video playback unit to the recording means of said video recording unit and which comprises selected means coupled to said video playback unit and to said digital-to-analog converter for selecting the output video signal from said video playback unit or a frame of analog video signals produced by said digital-to-analog converter to be supplied to the recording means of said video recording unit, whereby a still picture signal is recorded when the frame of analog video signals is selected;

switch means for receiving a video signal from said video playback unit and a video signal from the reproducing means of said video recording unit and selectively operative to couple one of said video signals to said sub-picture signal forming means and to couple the other of said video signals as a main picture signal;

combining means for combining said sub-picture and main picture signals to form a display signal for displaying a main picture and a sub-picture insert;

control means for controlling the operation of said switch means; and a housing for containing the video playback and video recording units, sub-picture signal forming means, switch means, combining means and control means.

* * * * *